United States Patent
Zaiser et al.

(10) Patent No.: US 11,707,151 B2
(45) Date of Patent: Jul. 25, 2023

(54) METHOD AND SYSTEM TO DECOUPLE STEAM PRESSURE FROM TEMPERATURE TO CONTROL SHEAR IMPARTED ON PRODUCT FLOW

(71) Applicant: Hydro-Thermal Corporation, Waukesha, WI (US)

(72) Inventors: James C. Zaiser, Elm Grove, WI (US); Sean O'Rear, Wauwatosa, WI (US)

(73) Assignee: Hydro-Thermal Corporation, Waukesha, WI (US)

( * ) Notice: Subject to any disclaimer, the term of this patent is extended or adjusted under 35 U.S.C. 154(b) by 384 days.

(21) Appl. No.: 17/006,007

(22) Filed: Aug. 28, 2020

(65) Prior Publication Data

US 2020/0390264 A1 Dec. 17, 2020

Related U.S. Application Data

(63) Continuation of application No. 15/448,217, filed on Mar. 2, 2017, now Pat. No. 10,758,073.

(Continued)

(51) Int. Cl.
*A23L 3/22* (2006.01)
*A47J 27/04* (2006.01)
(Continued)

(52) U.S. Cl.
CPC .......... *A47J 27/04* (2013.01); *A23L 3/22* (2013.01); *A23L 5/13* (2016.08); *A47J 27/024* (2013.01); *A47J 2027/043* (2013.01)

(58) Field of Classification Search
CPC .... A47J 27/04; A47J 2027/043; A47J 27/026; A47J 27/024; A23L 3/22; A23L 5/13
(Continued)

(56) References Cited

U.S. PATENT DOCUMENTS

| 4,160,002 A | * | 7/1979 | Janovtchik | A23L 3/225 |
| | | | | 99/453 |
| 4,168,657 A | * | 9/1979 | Hildebolt | A23J 3/22 |
| | | | | 425/380 |

(Continued)

FOREIGN PATENT DOCUMENTS

EP 0800775 A1 8/2000

OTHER PUBLICATIONS

International Preliminary Report on Patentability for PCT/US2017/020459 dated Sep. 13, 2018.

(Continued)

*Primary Examiner* — Reginald Alexander
(74) *Attorney, Agent, or Firm* — Andrus Intellectual Property Law, LLP

(57) ABSTRACT

A cooking system for cooking a product flow utilizing steam. A supply of steam is provided at a supply pressure that is regulated by a control unit to a regulated pressure. The supply of steam is provided to a plurality of steam injection cookers which are positioned within a product supply pipeline that receives a product flow. The product flow is cooked as the product flow passes through the product supply pipeline and the plurality of cookers. Each of the steam injection cookers includes a steam modulator that controls the amount of steam injected. By regulating the steam pressure and the steam modulator, the control unit can modify the amount of shear created within the product flow and control the temperature of the fluid. The cooking system further includes a clean-in-place system that can inject a cleaning solution into the steam supply pipeline and the plurality of steam injection cookers.

15 Claims, 3 Drawing Sheets

Related U.S. Application Data

(60) Provisional application No. 62/302,259, filed on Mar. 2, 2016.

(51) Int. Cl.
 *A23L 5/10* (2016.01)
 *A47J 27/024* (2006.01)

(58) Field of Classification Search
 USPC .......................................... 99/467, 483, 453
 See application file for complete search history.

(56) References Cited

U.S. PATENT DOCUMENTS

| | | | |
|---|---|---|---|
| 4,200,041 A * | 4/1980 | Hildebolt | A23J 3/22 99/516 |
| RE32,695 E * | 6/1988 | Nahra | A23C 3/0375 261/129 |
| 4,752,487 A | 6/1988 | Collyer et al. | |
| 5,842,497 A | 12/1998 | Drifka et al. | |
| 5,972,408 A | 10/1999 | Hardman et al. | |
| 7,025,338 B2 | 4/2006 | Cincotta et al. | |
| 2016/0374499 A1* | 12/2016 | Donarski | F22B 1/282 392/397 |

OTHER PUBLICATIONS

International Search Report and Written Opinion for PCT/US2017/020459 dated Sep. 14, 2017.
Partial International Search Report for PCT/US2017/020459 dated Jul. 5, 2017.

* cited by examiner

METHOD AND SYSTEM TO DECOUPLE STEAM PRESSURE FROM TEMPERATURE TO CONTROL SHEAR IMPARTED ON PRODUCT FLOW

BACKGROUND

The present disclosure generally relates to a method and system for heating or cooking a product utilizing steam. More particularly, the present disclosure relates to a system and method that control the pressure of steam, the amount of steam injected into the product flow and the pressure of the product flow to repeatably control the shear imparted on the product flow.

Current direct steam injection technologies either modulate the pressure of the steam being injected into a product flow as a means of controlling the temperature of the product flow or control the size of the steam orifice to control the amount of steam injected into the product flow. Each of these two technologies has several disadvantages for temperature control.

In the first scenario that modulates the steam pressure, the effects of pressure changes are not instantaneous and need a short amount of time to re-equilibrate to changing conditions. This leads to the temperature variation of the product flow when flow rates change or when plant steam pressure supplies change during production. These temperature fluctuations can lead to product damage or loss of aseptic conditions in a food production process.

Secondly, the shear imparted on the food from the velocity of the steam impacting the process fluid cannot be changed. For any given pressure, there is a set velocity of steam penetration, and thereby shear effects. Changing the pressure will change the shear effects but will also change the temperature of the product flow.

Third, very low pressure differentials are required in order to achieve the desired temperature for the product flow without over heating the product flow. These relatively low pressure differentials do not allow the steam to reach a high enough velocity to create high shear conditions. This reduces the ability for devices that utilize this method to be able mix, emulsify and vigorously cook foods which need high shear.

In the second scenario in which the size of the steam orifice is modified, the process is very stable and responsive to changing conditions; however, the shear imparted on the fluid can be significant and damaging when a greater temperature change is desired and more steam must be introduced into the product flow.

SUMMARY

The present disclosure provides a method and system to decouple steam pressure from temperature of food using direct steam injection to repeatably control the shear imparted to food. The present disclosure utilizes a plurality of steam injection heaters/cookers, such as available from Hydro-Thermal Corporation and shown in U.S. Pat. No. 7,025,338 to cook a product flow. The steam injection heaters/cookers of the present disclosure have the ability to control shear by utilizing a steam modulator to vary the steam orifices. This control is an extension of the internal modulation technology, whereby high pressure steam is connected directly to the system steam header.

In accordance with the present disclosure, the supply of steam is passed through a pressure control valve, which modulates the steam pressure to the plurality of steam injection heaters/cookers through PID control using a pressure transmitter as feedback. This control system provides the system of the present disclosure the ability to set the pressure of the steam supplied to the product flow, vary the steam orifices, and recall that same pressure every time that particular recipe is loaded in the specialized software.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
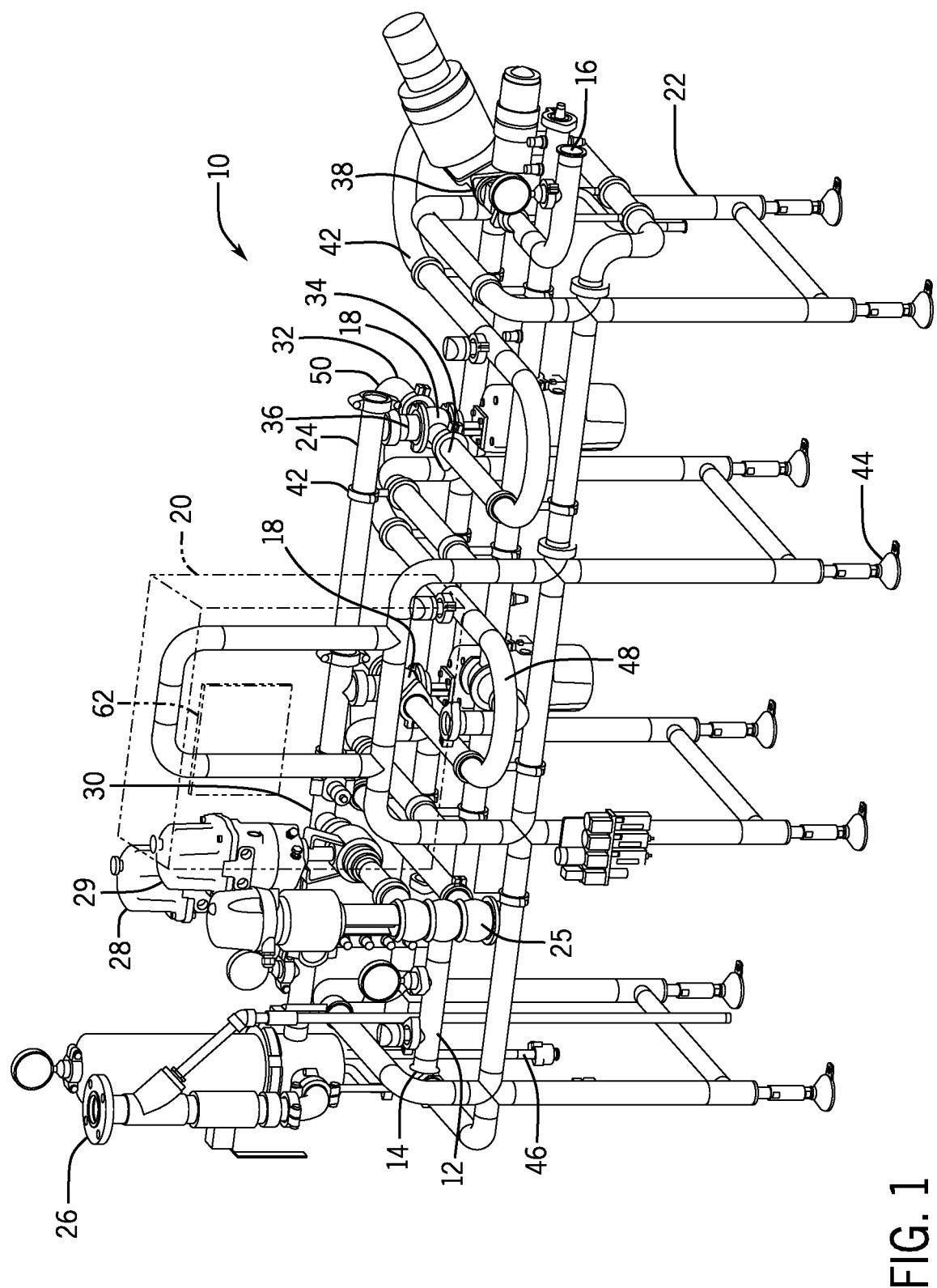
FIG. 1 is a schematic illustration of the control and processing system of the present disclosure.

FIG. 1 illustrates a cooking system 10 constructed in accordance with the present disclosure. The cooking system 10 is designed to cook a product flow as the product flow enters into a product supply pipeline 12 and flows from a product input 14 to a product output 16. The product supply pipeline 12 has generally constant diameter as the product supply pipeline 12 extends from the product input 14 to the product output 16. The product flow can be a wide variety of products, but is contemplated in the preferred embodiment as being a liquid food product, such as soups, sauces or other liquid based food product that needs to be cooked.

As shown in FIG. 1, a plurality of steam injection cookers 18 are positioned along the length of the product supply pipeline 12. In the embodiment shown in FIG. 1, two steam injection cookers 18 are located along the length of the product supply pipeline 12. However, it should be understood that additional steam injection cookers 18 could be utilized. The cooking system 10 of the present disclosure is designed to be modular such that additional cookers 18 and additional sections of the product supply pipeline can be added. In the embodiment shown, the steam-based injection heaters/cookers are Infuze® heaters sold and manufactured by Hydro-Thermal Corporation. The specific configuration of the steam injection cookers/heaters 18 is shown in U.S. Pat. No. 7,025,338, the disclosure of which is incorporated herein by reference. However, other types of steam injection cookers could be utilized while operating within the scope of the present disclosure.

In the embodiment shown in FIG. 1, a control unit 20 is positioned as part of the cooking system 10. The control unit 20 can be located at various different locations. In the embodiment shown, the control unit 20 is mounted to the support frame 22 at a general central location along the overall length of the cooking system 10. The control unit 20 can include varies different types of processing devices and should be interpreted as such.

The product flow enters into the product supply pipeline 12 at the inlet 14 and is received by a three-way diverter valve 25. The position of the three-way diverter valve 25 is controlled by the control unit 20. In a first position, the product flow travels through the remaining portions of the product supply pipeline 12. In a second position, the flow of liquid received at the inlet 14 is directed into the upper portion of the valve and to the transfer line 27, shown in FIG. 2. The second position is useful for cleaning, as will be described in detail below. A valve 29 allows for only one directional flow to the steam supply pipeline 24.

In addition to the product supply pipeline 12, the cooking system 10 includes a steam supply pipeline 24. The steam supply pipeline 24 receives a supply of steam at a supply pressure at the steam inlet 26. The steam inlet 26 enters into a steam pressure control valve 28. The steam pressure control valve 28 is a control valve that is operable to selectively modify the pressure of the steam as the steam passes from the steam inlet 26 to a steam outlet 30. The pressure of the steam at the steam outlet 30 will be at a regulated pressure controlled by the control unit 20 through feedback from the pressure sensor 31 shown in FIG. 2. The regulated pressure of the supply of steam at the steam outlet 30 is then fed to the remaining portion of the steam supply pipeline 24.

As illustrated in FIG. 1, each of the steam injection cookers 18 includes a product input 32, a product output 34 and a steam inlet 36. In the embodiment shown that utilizes the Infuze® cooker, the details of which are shown in issued U.S. Pat. No. 7,025,338, the disclosure of which is incorporated herein by reference, a steam modulator (not shown) is included within the heater body to control the amount of steam injected into the product flow as the product flow passes from the product input 32 to the product output 34. The control unit 20 is connected to each of the steam injection cookers 18 such that the control unit 20 can control the position of the steam modulator. By controlling the position of the steam modulator, the control unit 20 is able to control the amount of shear impacted on the product flow as the product flow passes through the steam injection cooker and control the temperature of the product flow.

As further illustrated in FIG. 1, a back pressure valve 38 is positioned near the product outlet 16 of the product supply pipeline 12. The back pressure valve 38 is operatively controlled by the control unit 20. The back pressure valve 38 controls the pressure of the product flow within the portions of the product supply pipeline 12 upstream from the back pressure valve 38. By controlling the pressure of the product flow within the product pipeline 12, the control unit 20 is able to create and maintain a differential pressure between the pressure of the product flow through each of the steam injection cookers and the regulated pressure of steam entering into the steam injection cooker. In addition, the product flow can be heated to a temperature above a flash temperature of 212 F.

In addition to the back pressure valve 38, the system further includes an outflow valve 40 (FIG. 2) located near the product output 16 of the product supply pipeline 12. The outflow valve 40 can be automated to redirect product flow as the product leaves the product outlet 16.

In the embodiment shown in FIG. 1, the support frame 22 includes a plurality of tubular sections that provide the required support for the components of the cooking system. A series of clamps 42 support both the product supply pipeline 12 and the steam supply pipeline 24. The support frame 22 includes a plurality of feet 44 that allow the support frame 22 to be supported upon an uneven surface.

In addition to the supply of steam, a cleaning solution supply can be connected to the product inlet 14 and directed through both the product supply pipeline 12 and the steam pipeline 24 through control of the three-way diverter valve 25. The control unit 20 can control the position of the diverter valve 25 such that either the steam from inlet 26 or the cleaning solution received at the product inlet 14 can be directed into the steam supply pipeline 24. When the cleaning solution is directed into the steam pipeline 24, the cleaning solution passes through each of the steam injection cookers to clean both the steam injection cookers, the steam pipeline and the product supply pipeline. The system is a clean-in-place system that does not require the removal of any elements, including the steam injection cookers.

As can be seen in FIG. 1, the portion of the product supply pipeline 12 connecting the two steam injection cookers 18 has an S-shape that includes a first curved section 48 and a second curved section 50. The first and second curved sections 48, 50 increase the heating and mixing as the product flow passes between the steam injection cookers 18.

Figure 2:
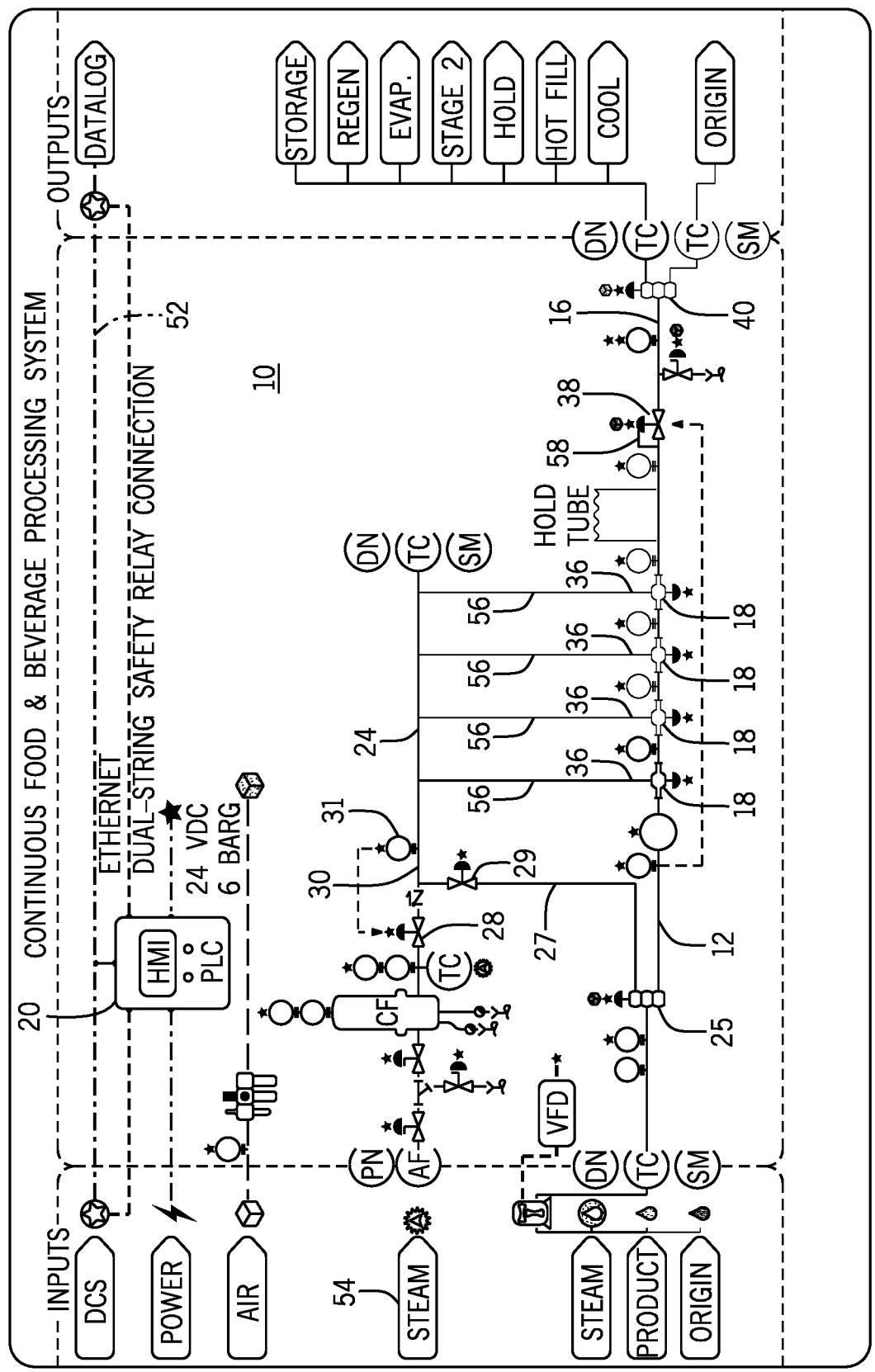
FIG. 2 is a perspective view of one embodiment of the steam injection cooking system of the present disclosure.

FIG. 2 illustrates the operative and control connections between the elements shown in FIG. 1 and described above. As shown in FIG. 2, the control unit 20 includes an Ethernet connection 52 such that the control unit 20 can communicate to monitoring or control systems at remote locations. In this manner, the operation of the cooking system 10 can be managed, controlled and monitored either locally or remotely. As illustrated in FIG. 2, the supply of steam 54 is supplied as an input to the steam supply pipeline 24. The supply of steam enters into the steam pressure control valve 28 which is operable by the control unit 20 to regulate the pressure of steam to a regulated steam supply pressure. The steam supply pipeline 24 includes multiple branches 56 that are each connected to a steam inlet 36 for one of the plurality of steam injection cookers 18. As described previously, each of the steam injection cookers 18 includes a steam modulator that controls the amount of steam injected into the product flow contained within the product supply pipeline 12. As described previously, the product supply pipeline 12 includes the back pressure valve 38 which is operated by the control unit 20 to control the pressure of the product flow within the product supply pipeline 12 upstream from the back pressure valve 38. As shown in FIG. 2, a pressure sensor 58 is positioned upstream from the back pressure valve 38. The pressure sensor 58 communicates with the control unit 20 so that the control unit 20 can monitor the pressure of the product flow before the back pressure valve 38. An outflow valve 40 is located at the termination of the product supply pipeline 12 and can be operated by the control unit 20 to direct the product flow leaving the cooking system 10.

The back pressure valve 38 also controls the amount of shear imparted due to depressurization of the process fluid after the leaving the steam based cooking system. This is measured as the difference between the induced pressure within the steam based cooking system 10 and the nominal line pressure after the cooking system 10. This allows a control paradigm where a set of control parameters can create a visual look and texture effect on a given recipe and then be repeated at different production facilities, even with different nominal line pressures. The control of both the steam pressure and the modulation of the cookers 18 allows for this repeatable design and use at multiple different facilities.

Utilizing this method of controlling differential pressure, the system of the present disclosure adds internal modulation technology to create a steady temperature rise ±1° F. at both low shear conditions and high shear conditions. The amount of shear can be controlled based both on the steam pressure and the amount of modulation in each of the cookers 18.

The mechanism of disclosure here described couples steam pressure control to a fixed pressure differential for the shear effect on a fluid. In addition, the cooking system 10 utilizes the temperature controls inherit through a modulating orifice size steam injection cooker 18.

Through calculation of steam velocity and product modification intent, targeted shear levels can be achieved by manipulating pressure differentiation of steam and fluid, and in absolute positions.

The shear imparted on the product flow is imparted from the velocity of the steam injection process. This velocity impacts the product flow in a controlled way, through the steam injection cookers 18, and yields a repeatable amount of shear affect on the liquid food product flow. This is different than externally modulated devices in that the high steam pressure generates a higher level of kinetic energy and thus a wider range of effective shear profiles on the food.

The use of a backpressure control system supports the results in end product modification to achieve a certain specification The shear imparted on the product flow from point one is added to the shear imparted from back pressure control onto the fluid. This yields a total amount of shear (or energy) imparted into the product flow. This total energy is added on a recipe basis to allow both intended and repeatable shear effect which can only be achieved in the cooking system 10 of the present disclosure.

The integrated system and its intended point of positioning create a unique opportunity to clean-in-place all elements for the steam delivery and product process piping and components. To carry out this function, it should be understood that all steam injectors leak process fluid back into the steam chamber. This is a fundamental problem in the technical design of this type of cooker 18, and it happens during start-up and shut-down, or any time in the processing of food when the product flow pressure increases over the steam pressure. The main force that prevents process fluid from entering the steam chamber is the actual pressure of the steam. In order to account for this design challenge, the system of the present disclosure incorporates a specially designed cleaning bypass line, so the steam manifold, check valve, and internals of the steam injector can be cleaned in place (without breaking apart the system).

The pathway is only half of the cleaning action, the other half is the software controls in the control unit 20 that function to correctly clean the cooking system without introducing food particles into the steam line. The PLC of the control unit 20 is coded with a cleaning routine such that water is rinsed through the process piping and, using information from a conductivity sensor, the program determines when rinsing is complete. As rinsing is ongoing, the conductivity of the fluid passing over the conductivity sensor changes, which is monitored by the control unit 20.

The bypass line is opened and the water is rinsed through the steam piping and, using information from a conductivity sensor, the program determines when rinsing is complete. During this process, the program opens and closes the steam cookers in an optimal pattern to ensure proper rinsing of the internals of each of the cookers 18.

Detergent is introduced into the cooking system 10 of the present disclosure and the program operating on the control unit 20 directs the flow of the solution through the steam and process piping while the cookers are being open and closed. Utilizing feedback from all of the built-in sensors, the program determines when cleaning is complete.

Water is then rinsed through the process and steam piping while the cookers are being open and closed. Using feedback from a conductivity sensor, the program determines when rinsing is complete. Washing and rinsing steps can be repeated for different detergents.

There is a key benefit to the introduction of this feature to the cooking system 10. Though steam can sterilize any food in the steam piping to prevent microbial contamination of subsequent batches, allergens can survive the pressurized steam environment to cause allergic responses in people. The method of cleaning in place allows for control of allergens and other non-living cross-contaminants in the food production process.

As shown in FIG. 1, the construction of the cooking system 10 of the present disclosure is in an S-shape and steam delivery system from overhead creates a compact, close coupled and sanitary system.

It has been calculated that there is a need to produce 5-10 pipe diameters after the steam infusion cooker 18 to allow for proper steam condensation into the process fluid. However, stable condensation is aided by flow mixing inside the pipe. In order to create a system that was compact in design (in order to meet the needs of the food industry), "S" shaped piping is used after each of the cookers 18. This shape allows 10 feet of linear piping to only take up 2 feet of length on the system, but create a very effective mixing zone. As fluid passes through the first curve of the "S" shape, the flow changes direction twice. In the elbow section, the outside wall channel has a faster velocity gradient than the inside wall channel, which creates a turbulent mixing zone. In the straight section of the "S", the flow settles and a temperature reading is taken through a temperature transmitting sensor. Finally, the process fluid enters a second curve section which re-mixes the process fluid immediately before the next section.

The dimensions of the "S" section were designed such that it is a repeatable section. Since the length of the system is not defined—there can essentially be any number of cooking sections, holding sections, or control sections in the any given system This design was also chosen to create a linear array of control points. All of the cooking sections are in a straight line as shown in FIG. 1, which allows the steam service to produce the least steam pressure drop to each cooking zone. The temperature control transmitters are in a line such that it yields a repeatable section in the supporting conduit line to run the data cables back to the main control cabinet.

Modular design allows for hold tube arrays where the reconnection point is immediately next to the subsequent control point. The "S" sections can open up to form a "U" section at any point (between cookers or after the final cooker) to connection to any intermediate processor (hold tube, hold tank, mixer, homogenizer, etc.) of any length due to the inherent "S" shape, and then reconnect back to the system piping to continue processing in the system of the present disclosure.

Figure 3:
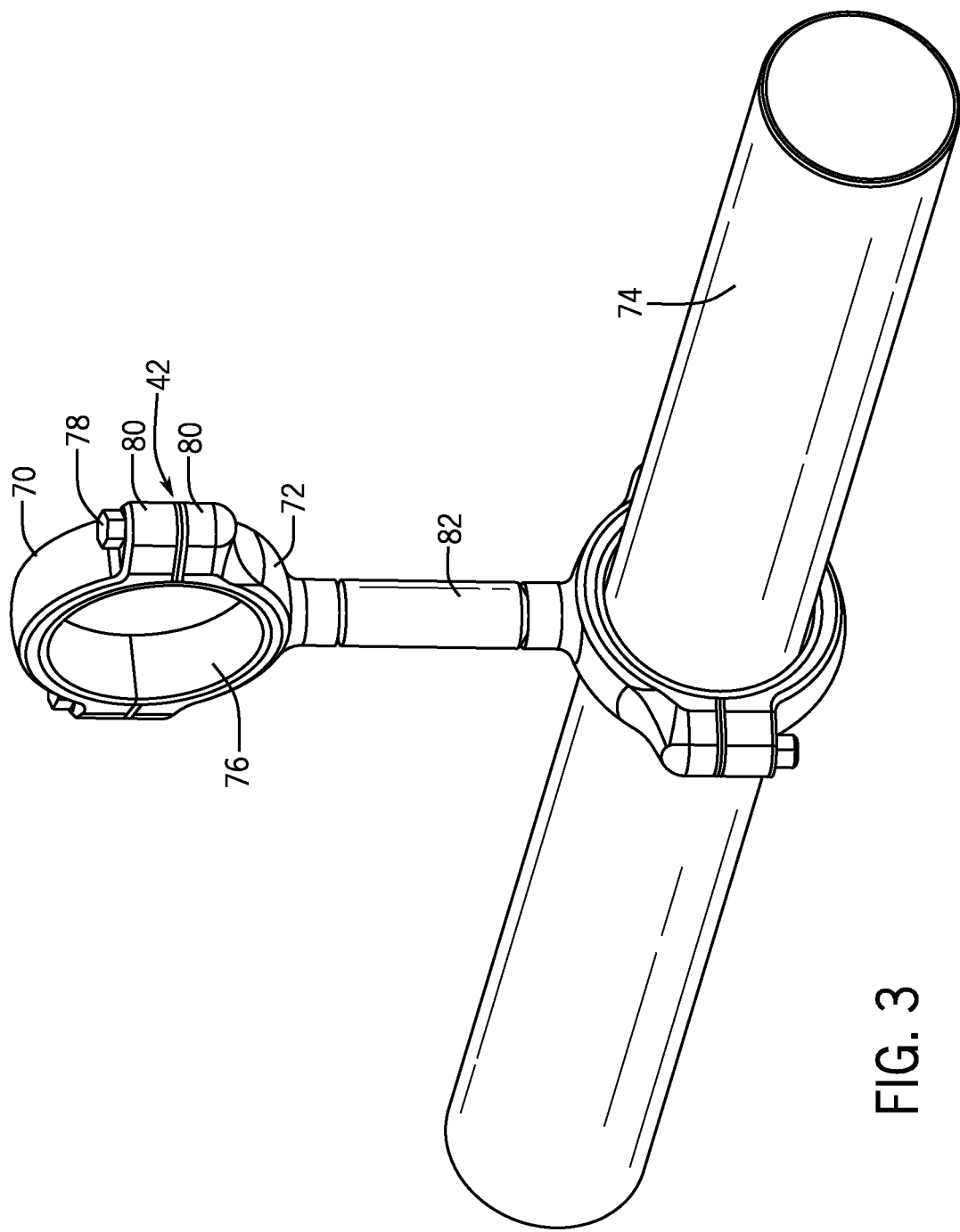
FIG. 3 is a perspective view of a pipe clamp of the present disclosure.

Another feature of the present disclosure is a clamping system for connection to the support frame 22. Through the use of hygienic piping clamps 42, all of the components of the system can be attached to the frame 22 in a very stable and supportive way. As shown in FIG. 3, the pipe clamps 42 each include a first half 70 and a second half 72 that surround the outer diameter of the pipe section 74. Each of the first and second halves 70, 72 include an inner liner 76 that contacts the outer surface of the pipe section 74. The first and second clamp halves 70, 72 are joined by threaded connectors 78 received within outer connective portions 80. The connectors 78 can be rotated to increase or decrease the clamping pressure on the outer diameter of the pipe section 74. In the embodiment shown, a support portion 82 connects a pair of the clamps 42 to support one pipeline relative to another pipeline. The clamps 42 allow the pipe sections to be supported by the support frame without the need for welded connections, which can create voids. This allows for a completely sealed connection to the frame which disallows microbial growth, but offers two new key benefits. The first benefit is that the support frame and components can be disassembled in the field and the modifications can be performed on the system with no welding. This is an important feature since welding has been shown to create pin-holes and hardening which lead to cracks that form hygiene problems in a food plant. Secondly, the clamps 42 for a complete seal around the pipe made of food grade silicone. This silicone allows a certain degree of deflection such that the natural harmonic vibrations inherent in steam injection is dampened and not transferred to throughout the system.

The clamping system additionally allows for the installation of accessories and add-ons (like operator guards) to the system without welding or skilled labor.

Another feature of the present disclosure is the use of an ancillary tubing system that contains within a sealed mechanism the wiring and cable harness to components leaving pockets and bacteria traps minimized to a short pigtail position on the instrument it is controlling.

The standard wire bundles in the food industry are not ideal as they hold water (through capillary action) between the cables in the bundle. The standing water promotes microbial growth and creates a difficult to clean area. The conduit system of the present disclosure was designed specifically to control the wiring and air tubing with as few penetrations into the control cabinet as possible, while additionally creating single wires and air tubing exiting the conduit system to maintain the overall hygiene of the external system. This prevents microbial growth by removing areas where capillary action with retain water, and also exposing every individual cable for ease of cleaning.

Yet another feature of the present disclosure is that the delivery of the control system is made available through local and internet protocol access appropriately and permissions. In particular, remote monitoring allows production to be run while management tasks like throughput, quality, and recipe planning can be run concurrently.

The control paradigm of the system of the present disclosure is such that any parameter of control of the system can be accomplished through the same interface screen 62 on the control unit 20 while running. This allows user accounts with elevated permissions to log into the system without stopping the system or changing screens, and make changes to the behavior of the system (such as speed of reaction, order of control, and alarming) without stopping production. The result is that the system has a very intuitive, natural and powerful interface from which all run functions can be completed. A distributed control system (computer control system) can also interface with the cooking system to control certain functions of the system. While the code that controls the secrets of our control paradigm are obfuscated, the ability to load and process recipes, log data, and clean the system can be easily accomplished by the DCS interface.

The cooking system 10 of the present disclosure can also be controlled to prevent overshooting during major process variation. The system software senses changes in the incoming process conditions using a combination of flow and temperature sensor feedback. Using this information, the program pre-emptively reacts to the changes to prevent large overshoots or undershoots in temperature as a result of the changes in process conditions. This is beneficial as standard food equipment would result in product damage to high temperature spikes, or loss of aseptic conditions due to under cooked foods.

In accordance with the present disclosure, multiple integrated PID loops are required for control. The cooking system 10 has a very complex control system with obfuscated logic controlled by the manufacturer. This logic is special due to the way the four control loops affect each other during the production process. The control loops are:

Product Flow: A pump is used to initiate product flow and the set flow rate of the product flow is controlled by the program using feedback from the flowmeter and through trend data from the run history. This product flow reaches an equilibrium at the setpoint, and in itself, is simple to control.

Product Pressure: The second loop is the product back pressure valve, which will restrict product flow to increase the pressure in the product piping system. This back pressure valve 38 is controlled by the program using feedback from the product pressure transmitting sensor, but at the same time reduces the flow, so the flow PID loop has to re-calculate the new equilibrium.

Steam Pressure: Steam pressure is then turned on and is controlled by the program using the steam pressure valve 28 and feedback from the steam pressure transmitting sensor. However, this added pressure affects the back pressure, which in turn affects the flow, and the system of loops must re-equilibrate.

Product Temperature: Finally, the steam is injected into the process flow in the fourth loop, which affects the temperature and viscosity of the fluid in the product flow. This again affects the other three loops and needs to re-equilibrate.

The complex nature of managing the combination of these loops requires a deep understanding of the relationships between the loops and the fundamental nature of controlled steam injection. This deep understanding was developed through steam testing performed at university labs, analysis of historical application data, etc.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of cooking a product flow using steam, the method comprising the steps of:
  receiving a supply of steam at a supply pressure;
  regulating the supply of steam to a regulated steam pressure to provide a regulated supply of steam at the regulated steam pressure to a steam supply pipeline;
  receiving the regulated supply of steam at the regulated steam pressure at a steam inlet of at least one steam injection cooker;
  receiving a product flow in a product supply pipeline having a product input and a product output;
  receiving the product flow from the product supply pipeline at a product input of the at least one steam injection cooker;
  measuring a pressure of the product supply flow; and
  providing a control unit operable to adjust the regulated steam pressure, the pressure of the product flow and a steam modulator within the at least one steam injection cooker to control the pressure differential between the pressure of the product supply flow at the product input of the at least one steam injection cooker and the regulated steam pressure at the steam inlet of the at least one steam injection cooker.

2. The method of claim 1 wherein the control unit is operable to control the operation of a steam pressure control valve positioned to receive the supply of steam and the steam modulator.

3. The method of claim 1 further comprising the step of positioning a back pressure control valve near an output of a product supply pipeline, wherein the control unit is operable to control the back pressure control valve to control the pressure of the product flow received at the product input of the at least one steam injection cooker.

4. The method of claim 1 further comprising the step of connecting a cleaning solution supply line including a supply of cleaning solution to clean a steam supply pipeline connected to the at least one steam injection cookers.

5. The method of claim 1 further comprising the step of operating an outflow valve located at the outlet of the product supply pipeline to control the flow direction of the product flow leaving the outlet of the product supply pipeline.

6. A method of cooking a product flow using steam, the method comprising the steps of:
receiving a supply of steam at a steam pressure control valve at a supply pressure;
operating the steam pressure control valve to provide a regulated supply of steam at a regulated pressure to a steam supply pipeline;
receiving the regulated supply of steam at the regulated pressure at a steam inlet of each of a plurality of steam injection cookers;
receiving a product flow in a product supply pipeline having a product input and a product output;
receiving the product flow from the product supply pipeline at a product input of each of the plurality of steam injection cookers;
positioning a product pressure sensor in the product supply pipeline;
measuring the pressure of the product supply flow with the product pressure sensor; and
providing a control unit operable to adjust the steam pressure control valve and a steam modulator within each of the plurality of steam injection cookers to control the pressure differential between the pressure of the product supply flow within the product supply pipeline and the regulated pressure of the supply of steam.

7. The method of claim 6 wherein the control unit is operable to control the operation of the steam pressure control valve positioned to receive the supply of steam and the steam modulator.

8. The method of claim 6 further comprising the step of operating a back pressure control valve positioned near an output of a product supply pipeline to control the pressure of the product flow received at the plurality of steam injection cookers.

9. The method of claim 8 wherein the control unit is operable to control the differential pressure between the regulated pressure of the supply of steam and the regulated pressure of the product flow.

10. The method of claim 6 further comprising the step of connecting a cleaning solution supply line including a supply of cleaning solution to clean a steam supply pipeline connected to each of the plurality of steam injection cookers.

11. The method of claim 6 further comprising the step of operating an outflow valve located at the outlet of the product supply pipeline to control the flow direction of the product flow leaving the outlet of the product supply pipeline.

12. The method of claim 6 wherein the product supply pipeline includes a plurality of S-shaped connecting portions each positioned between a product output of one of the plurality of steam injection cookers and a product input of another of the plurality of steam injection cookers.

13. A method of cooking a product flow using steam, the method comprising the steps of:
receiving a supply of steam at a steam pressure control valve at a supply pressure;
operating the steam pressure control valve to provide a regulated supply of steam at a regulated pressure to a steam supply pipeline;
receiving the regulated supply of steam at the regulated pressure at a steam inlet of at least one steam injection cooker;
receiving a product flow in a product supply pipeline having a product input and a product output;
receiving the product flow from the product supply pipeline at a product input of the at least one of steam injection cooker;
positioning a product pressure sensor in the product supply pipeline;
measuring the pressure of the product supply flow with the product pressure sensor; and
providing a control unit operable to adjust the steam pressure control valve and a steam modulator within the at least one steam injection cooker to control the pressure differential between the pressure of the product supply flow within the product supply pipeline and the regulated pressure of the supply of steam.

14. The method of claim 13 further comprising the step of operating a back pressure control valve positioned near an output of a product supply pipeline to control the pressure of the product flow received at the at least one steam injection cooker.

15. The method of claim 13 wherein the control unit is operable to control the back pressure control valve to control the differential pressure between the regulated pressure of the supply of steam and the regulated pressure of the product flow.

* * * * *